(12) United States Patent
Poyntz (10) Patent No.: US 6,926,337 B2
(45) Date of Patent: Aug. 9, 2005

(54) RETRACTABLE TRUCK TARPAULIN SYSTEM

(76) Inventor: Philip Poyntz, 11 Southwood Crescent, Box 519, Sutton, Ontario (CA), L0E 1R0

( * ) Notice: Subject to any disclaimer, the term of this patent is extended or adjusted under 35 U.S.C. 154(b) by 0 days.

(21) Appl. No.: 10/882,076

(22) Filed: Jul. 1, 2004

(65) Prior Publication Data

US 2004/0239142 A1 Dec. 2, 2004

Related U.S. Application Data

(63) Continuation-in-part of application No. 10/439,236, filed on May 16, 2003, now Pat. No. 6,779,828.

(51) Int. Cl.$^7$ .................................................. B60P 7/04
(52) U.S. Cl. ................ 296/98; 296/100.11; 296/100.14
(58) Field of Search ............................. 296/98, 100.01, 296/100.11, 100.12, 100.13, 100.14, 100.15, 100.16, 100.17, 100.18

(56) References Cited

U.S. PATENT DOCUMENTS

| | | | |
|---|---|---|---|
| 5,002,328 A | 3/1991 | Michel | |
| 5,152,575 A | 10/1992 | DeMonte et al. | |
| 5,303,972 A | 4/1994 | Heider et al. | |
| 5,328,228 A | 7/1994 | Klassen | |
| 6,199,935 B1 | 3/2001 | Waltz et al. | |
| 6,206,449 B1 | 3/2001 | Searfoss | |
| 6,513,856 B1 | 2/2003 | Swanson et al. | |
| 6,527,331 B2 | 3/2003 | Searfoss | |
| 6,641,199 B1 | 11/2003 | Hicks | |
| 6,783,168 B2 * | 8/2004 | Searfoss | 296/98 |
| 6,783,312 B2 * | 8/2004 | Smith | 410/97 |
| 6,805,935 B2 * | 10/2004 | Ashida et al. | 428/64.1 |
| 6,811,202 B2 * | 11/2004 | Hornady | 296/100.01 |
| 2002/0021018 A1 | 2/2002 | Royer | |
| 2003/0090124 A1 | 5/2003 | Nolan et al. | |
| 2004/0150244 A1 * | 8/2004 | Eggers et al. | 296/98 |
| 2004/0189038 A1 * | 9/2004 | Nolan et al. | 296/98 |
| 2004/0201240 A1 * | 10/2004 | Corbett | 296/100.18 |
| 2004/0217622 A1 * | 11/2004 | Talbot | 296/98 |

FOREIGN PATENT DOCUMENTS

| | | |
|---|---|---|
| EP | 1 070 617 A1 | 1/2001 |
| GB | 2041839 | 9/1980 |
| GB | 2066746 | 7/1981 |
| GB | 2084241 | 4/1982 |
| GB | 2236290 | 4/1991 |
| JP | 353093520 | 8/1978 |

OTHER PUBLICATIONS

Truck and Trailer, Aug. 2002, p. 3.
Truck and Trailer, Apr. 2002, vol. 16, No. 4, 1 page.
Truck and Trailer, Sep. 2002, p. 10—Roll–Tite.
Truck and Trailer, Aug. 2002, p. 31.
Truck and Trailer, Aug. 2002, vol. 16, No. 8—Roll–Tite, 1 page.
Truck and Trailer, Oct. 2002, p. 27.
Roll–Rite, 2001 brochure, pp. 6 to 9.
Shurco 2002 Tarps Catalog, pp. 16 to 41.
Cramaro Tarpaulin systems—Tarp–All Brochure, 4 pages.
Cramaro Tarpaulin Systems—Deluxe Side Kits Brochure, 2 pages.
Cramaro Tarpaulin Systems—Tarp all Brochure, 4 pages.

* cited by examiner

Primary Examiner—H. Gutman (57) ABSTRACT

A retractable trailer enclosure system for use in covering at least part of the bed of a truck trailer having removable U-shaped bows vertically mounted thereon. The trailer enclosure system includes a flexible cover which may be retracted or extended to cover and uncover the trailer bed and goods positioned thereon. An elongated spindle is provided which is mounted to the trailer by a spindle mount assembly and can be used to wind and unwind the cover. The spindle is movably supported such that the cover extends vertically downwardly to a location below a surface of a trailer bed side when the cover is fully extended. The spindle may be moved along a generally arcuate extending path.

22 Claims, 7 Drawing Sheets

RETRACTABLE TRUCK TARPAULIN SYSTEM

RELATED APPLICATIONS

This application is a continuation-in-part of U.S. patent application Ser. No. 10/439,236 filed 16 May 2003, now U.S. Pat. No. 6,779,828 and entitled "Retractable Truck Tarpaulin System".

SCOPE OF THE INVENTION

The present invention relates to a tarp enclosure system used for covering the upper surface of a truck bed or railcar, and more particularly a tarp enclosure system which is suitable for use with removable trailer bows and which may be extended or retracted from a remote location by a user standing on the ground.

BACKGROUND OF THE INVENTION

In the haulage of bulk goods such as heavy machinery, steel rods and coils, sod and non-prepackaged consumer goods, it is often desirable to ship the goods via a flat bed truck or train trailer. Conventional truck or train trailers consist of a flat rectangular trailer bed surface characterized by parallel longitudinal sides and lateral ends. It is known to cover the goods on the trailer with a tarp to protect the goods from exposure to the elements and, in the case of goods such as sod, to prevent debris and/or detritus from blowing from the trailer. In the most basic construction, the trailer is provided with a number of removable U-shaped metal bows which are used to support the flexible cover or tarp above the load while protecting it from the environment. Typically, the bows consist of a single length of bent tubular steel stock. The ends of the bows are removably secured in a complementary sized slot or hole formed along the opposing longitudinal sides of the trailer bed.

Conventionally, the trailer beds are enclosed by manually securing the tarp in place stretched over both the bows and the load on the trailer by means of shock cords and/or hold-down straps. When loading or unloading the trailer, the shock cords used to secure the flexible tarp in place stretched over the bows are manually released and the cover manually pulled aside. Once the cover has been removed, the driver or warehouseman removes the bows by pulling their ends from the slots in the trailer bed. Once removed, access to the surface of the trailer bed may be obtained along one or both of its longitudinal sides. Thereafter, the goods to be shipped are placed on the bed and the bows and cover are repositioned.

The manual positioning of the tarp typically requires that the driver or individual loading the trailer climb overtop of both the trailer bed and the load, while simultaneously positioning the tarp and re-securing it in place with the shock cords. The manual positioning of the tarp is both time consuming and inefficient. Furthermore, in physically climbing overtop of the loaded goods, there is increased risk of injury if, for example, the individual falls off the trailer and/or trips or falls on the loaded goods.

In an effort to simplify the manual loading and/or unloading of trailers, various individuals have proposed tarp covering or enclosure systems. U.S. Pat. No. 5,152,575 to DeMonte et al discloses a tarp enclosure system which incorporates a number of horizontally slidable U-shaped bows which are used to collapse or extend a cover over the top of a truck trailer bed in an accordion-like manner. The Wahpeton Canvass Company of North Dakota has sold in conjunction with its trade mark SHURCO™ various enclosure systems which are adapted to be rolled or unrolled horizontally over the open top of dump truck and grain trailer bins.

Heretofore, however, the marketplace has achieved little or no success in providing vertically retractable tarp systems which are adapted to permit lateral access to a flat truck or railcar trailers which have bows which are either permanently secured to the trailer bed, or which are removable for loading and unloading goods thereon.

SUMMARY OF THE INVENTION

Accordingly, it is an object of the invention to provide a retractable trailer enclosure system for use in covering at least part of the upper surface of the bed of a truck or railcar trailer, and which has tarp or cover supporting bow members which are either permanently secured to the trailer bed, or which are removable so as to permit loading and/or unloading of goods onto the trailer from at least one of its lateral sides.

Another object of the invention is to provide a retractable trailer enclosure system which includes a flexible tarpaulin or cover, hereinafter also generally referred to as a tarp, which may be selectively vertically and/or horizontally retracted or extended so as to expose or cover the upper surface of a truck or train trailer bed by a user standing beside the trailer or from another remote location.

Another object of the invention is to provide a retractable trailer enclosure system which includes a flexible tarp which when extended over the trailer, is adapted to provide a substantially fluid-seal tight arrangement between the longitudinal sides of the trailer bed and the tarp.

Another object of the invention is to provide a retractable trailer enclosure system which may be vertically retracted along one longitudinal side of a flat truck or rail car trailer, so as to permit the loading or unloading of goods thereon by a conventional fork lift, tractor, crane or the like.

A further object of the invention is to provide in combination a trailer and a retractable tarpaulin system which includes one or more U-shaped bows and a flexible cover or tarp which may be selectively extended or retracted to cover or uncover the U-shaped bows of a trailer, and which when retracted, permits the bows to be manually lifted clear of the trailer to facilitate its loading or unloading.

To achieve at least some of the aforementioned objects, the present invention provides a retractable trailer enclosure system for use in covering at least part of the bed of a truck trailer, railcar trailer or the like, hereinafter collectively referred to as a "trailer". Typically, the trailer has a flat horizontally extending bed characterized parallel and longitudinally elongated sides, lateral front and rear ends and a generally flat upper surface.

One or more bows are vertically mounted on the trailer bed and are used to support a flexible cover above the transported goods, so as to prevent rain, snow and/or wind damage to the goods, as well as preventing debris from blowing off of the trailer during transportation. The bows are formed from lengths of straight, bent or welded steel or aluminum stock and when assembled have a generally inverted U-shape. The bows have a width selected to span substantially the lateral width of the trailer bed and have a height which is selected having regard to the desired cargo to be moved, and which in the typical case is selected at between 4 and 10 feet, and more typically between about 6 and 8 feet. In a more economical construction, the bows are provided as part of a welded lattice, permanently secured to the trailer bed. More preferably, however, one or more of the bows are removable, allowing the trailer roof to be largely opened up to facilitate loading and/or unloading of the goods. Removable bows are mounted to the trailer in a number of manners, as for example, with the lower ends of each vertical side of the bows being received in a complementary sized socket formed in the upper surface of the trailer bed.

Although not essential, at least one and preferably two to three bows are supported by a removable truss member. The truss members consist of a vertically extending support which extends from the trailer bed, upwardly to engagingly support an underside of the bed. An adjustable T-support provided on the truss member is brought into contact with a bow, wedging the truss member in place as a vertical support. The T-support is adjustable in height and is configured to enable the truss members to be moved into a desired position under a selected bow, having regard to the positioning and form of the goods to be shipped.

The cover or tarpaulin of the trailer enclosure system may be retracted to expose and permit access to the trailer bed surface, or extended to cover the trailer bed together with any goods which are positioned thereon for transport. An elongated spindle is provided which is mounted to the trailer by means of a spindle mount assembly. As will be described, the spindle is used to wind the tarp, coiling or uncoiling it thereabout in its retraction or extension. The cover when extended is stretched over the bows with one of its longitudinal edges secured to the spindle. The spindle is elongated along its longitudinally elongated axis, and although not essential, preferably has a length generally corresponding to the length of the portion of the trailer bed to be covered. More preferably, the spindle and cover each have a longitudinal length corresponding to that of the trailer sides.

The spindle is movably supported in an orientation with its spindle axis generally parallel to the upper surface of the trailer bed by the spindle mount. More preferably, the spindle mount is used to secure the spindle so that it may be moved along a generally arcuate extending path or corridor. In a simplified construction, the spindle mount consists of a pair of spaced pivot rods. Each of the pivot rods is elongated so as to extend from a first end portion to a second distalmost end portion. The first end portion of each of the pivot rods is secured to an associated pivot aligned with a pivot axis which preferably is also oriented parallel to the spindle axis. The pivot rods, for example, may be mounted to the trailer such that the second end of each rod may be movable from a generally lateral orientation along the arcuate path or corridor about the pivot axis. The spindle is thus movable with the pivot rods from a lowered position wherein the second end of each of the pivot rods is moved adjacent to the first longitudinal side of the bed, and a retracted position wherein the distal end of the pivot rods is moved radially about the pivot axis therefrom.

Each of the pivot rods is more preferably provided as a telescoping rod with the distalmost end being movable radially outwardly from the pivot axis. In this regard, the arcuate corridor along which the spindle moves may be defined as the path between the outwardmost radial path along which the distalmost end travels when fully extended, and an innermost radial path along which the distalmost end travels when fully retracted. Preferably, a tensioner is provided to resiliently bias the distalmost end to the retracted position.

A manual, electric or other power drive is used to selectively rotate the spindle to thereby extend or retract the tarp over the bows. When the tarp is in an initial extended position covering the trailer bed and bows, the initial rotation of the spindle about its spindle axis results in the winding of the cover about the spindle. As the cover is coiled about the spindle, the spindle is drawn by advancing along the tarp in movement over the arcuate path. In this manner, the tarp may be retracted to expose the trailer bed and bows simply by having it coil about the spindle upon its rotation. In a similar manner by reversing the direction of rotation of the spindle, the tarp is unwound to recover the trailer bed and bows.

The trailer may be provided with front and rear bulkheads, each consisting of a vertical panel spanning across the front and rear lateral ends of the trailer. The bulkheads may be formed of metal and/or wood having a square or generally rectangular shape and most preferably having a profile generally corresponding to that of the U-shaped bows. The bulkheads, although not essential, provide additional safety and assist in preventing a load from shifting in the front to back direction as the truck or railcar brakes.

Although not essential, a spring or other biasing element may be provided to assist in moving the spindle along the arcuate corridor. In another construction, gearing may be used to facilitate the movement of the spindle along its arcuate path. In one possible construction, a toothed pinion or other gear may be secured to one or both ends of the rotatable spindle, and a complementary sized rack is secured over at least part of the upper surface of the adjacent bulkhead. The rotation of the spindle thus moves the gear along the rack to assist in guiding the spindle in movement, as the cover is coiled or uncoiled.

Although not essential, it is most preferable that the tarp enclosure system includes a pair of elongated spindles, each mounted to an associated spindle mount and secured to a respective longitudinal edge of the tarp. Such a construction advantageously permits access to either side of the truck trailer bed.

Accordingly in one aspect, the present invention resides in a retractable trailer enclosure system for covering at least part of the bed of a truck trailer characterized by longitudinally elongated parallel sides and laterally extending ends, the enclosure system comprising, a flexible cover having a size selected to overly said part of the trailer bed, a spindle elongated along an axis and having a length generally corresponding to the length of a first one of said trailer sides, a spindle mount for movably supporting the spindle in a substantially horizontal orientation generally parallel to the longitudinal direction of said first side, the spindle mount including a pair of pivot rods,     a first one of said pivot rods being pivotally secured at an associated pivot proximate a first one of said lateral end of said bed,     the second other one of said pivot rods being pivotally secured at an associated pivot proximate to the second other one of said lateral ends,     each of the first and second pivot rods extending from said associated pivot laterally to a distalmost end and further comprising a spindle coupling at said distalmost end thereof, said spindle coupling rotatably supporting said spindle, said each of said pivot rods comprises a telescoping rod having an extendible member which is movable between a retracted position spaced towards said associated pivot and an extended position moved outwardly therefrom, the spindle coupling being coupled to the extendible member, a drive for selectively journaling the spindle in rotational movement about its axis, the cover being secured along an edge portion to the spindle whereby the rotation of the spindle by said drive winds or unwinds the cover about the spindle to retract or extend the cover over said part of the bed.

In another aspect, the present invention resides in a retractable trailer enclosure system for covering at least part of the bed of a truck trailer having longitudinally elongated parallel sides and laterally extending ends, at least one bow member having a generally horizontal member laterally spanning said bed and supported a vertical distance thereabove, the enclosure system comprising, a flexible cover having a longitudinal length substantially corresponding to a length of said parallel sides and a lateral width selected whereby with the cover in a fully extended orientation overlying the at least one bow member, the cover extends vertically downwardly to a lower edge portion located vertically below a surface of an adjacent one of said trailer bed sides, a spindle elongated along an axis and having a length generally corresponding to the length of a first one of said trailer sides, a spindle mount for movably supporting the spindle in a substantially horizontal orientation generally parallel to the longitudinal direction of said first side, the spindle mount including a pair of pivot rods, a first one of said pivot rods being pivotally secured at an associated pivot proximate a first one of said lateral end of said bed, the second other one of said pivot rods being pivotally secured at an associated pivot proximate to the second other one of said lateral ends, each of the first and second pivot rods extending from said associated pivot laterally to a distalmost end, the distal most end of each of said pivot rod being movable relative to said associated pivot, and further comprising a spindle coupling at said distalmost end thereof, said spindle coupling rotatably supporting said spindle between a retracted position spaced towards said associated pivot and an extended position moved outwardly therefrom, a drive for selectively journaling the spindle in rotational movement about its axis, the cover being secured along said lower edge portion to the spindle whereby the rotation of the spindle by said drive winds or unwinds the cover about the spindle to retract or deploy the cover over said part of the bed, whereby with said cover unwound in said fully extended orientation, the continued rotation of said spindle moves said spindle beneath said surface of said adjacent trailer bed side to assist in tightening the cover against the at least one bow member.

More preferably, the cover is retracted by actuating said drive to rotate said spindle in a first direction to wind said cover thereabout in a first winding direction, and said drive is operable to rotate said cover in a second opposite direction to deploy said cover, whereby with said cover unwound in said fully extended orientation, the continued rotation of the spindle in the second direction winds the cover about the spindle in a second winding direction to assist in tensioning said cover against said bow members.

In a further aspect, the present invention resides in a retractable enclosure system for covering the upper surface of a longitudinally elongated bed of a railcar or truck trailer comprising, a plurality of bow members laterally spanning said trailer bed, a flexible cover having a longitudinal length substantially corresponding to the length of said bed and a lateral width selected whereby with the cover in a fully extended orientation overlying the bow members, the cover extends vertically downwardly to a lower edge portion located vertically below a surface of an adjacent trailer bed side.

a spindle elongated along an axis and having a length substantially corresponding to the longitudinal length of the bed, a spindle mount for movably supporting the spindle in an orientation substantially parallel to the upper surface of the bed, the spindle mount comprising a pair of pivot rods each being elongated from a first end portion to a second end portion, the second end portion of each of said pivot rods being movable relative to said first end portion between a retracted position spaced towards said first end portion and an extended position moved distally therefrom, a front end bulkhead adjacent to said first lateral end of said bed and a rear end bulkhead adjacent to said second lateral end of the bed, the first end portion of a first one of said pivot rods being mounted at an associated first pivot secured to said first bulkhead, the first end portion of the second other one of said pivot rods being mounted at an associated second pivot secured to said second bulkhead, the spindle being rotatably supported by the second end portions of each of the pivot rods, a drive operable to selectively journal the spindle in rotational movement about its axis, and wherein the cover is secured along the lower edge portion to the spindle whereby the rotation of the spindle by the drive winds or unwinds the cover about the spindle to retract or deploy the cover over the bed, and whereby with said cover unwound in said fully extended orientation, the continued rotation of said spindle moves said spindle to a position substantially beneath said surface of the adjacent bed side.

In yet another aspect, the present invention resides in a retractable trailer enclosure system for covering a trailer bed characterized by longitudinally elongated first and second parallel sides and laterally extending ends, the enclosure system comprising, a flexible cover having a lateral width selected whereby with the cover in a fully extended orientation overlying the trailer bed, the cover extends vertically downwardly to first and second lower side edges with said first side edge located below a surface of said first trailer bed side, and said second side edge located below a surface of said second trailer bed side, a first spindle elongated along a first spindle axis and having a length generally corresponding to the length of said first trailer side, a first spindle mount for movably supporting the first spindle in an orientation generally parallel to the longitudinal direction of said first side, the first spindle mount including a pair of pivot rods each secured at an associated pivot and rotatable about a first pivot axis extending generally parallel to said first spindle axis, each pivot rod extending from said associated pivot to a distalmost end and further comprising a first spindle coupling at said distalmost end thereof, said first spindle coupling rotatably supporting said first spindle, a first drive for selectively journaling the first spindle in rotational movement about said first spindle axis, a second spindle elongated along a second spindle axis and having a length generally corresponding to the length of said second trailer side, a second spindle mount for movably supporting the second spindle in an orientation generally parallel to the longitudinal direction of said second side, the second spindle mount including a pair of pivot rods each secured at an associated pivot and rotatable about a second pivot axis extending generally parallel to said second spindle axis, each pivot rod extending from said associated pivot to a distalmost end and further comprising a second spindle coupling at said distalmost end thereof, said second spindle coupling rotatably supporting said second spindle, a second drive for selectively journaling the second spindle in rotational movement about said second spindle axis, the first lower side edge of the cover being secured to the first spindle, whereby the rotation of the first spindle by said first drive winds or unwinds the cover about the first spindle to retract or deploy the cover over said first side of the bed, whereby with said cover deployed in said fully extended orientation over the first side of the bed, the continued rotation of said first spindle moves said first spindle beneath said first side of the bed, the second lower side edge of the cover being secured to the second spindle whereby the rotation of the second spindle by said second drive winds or unwinds the cover about the second spindle to retract or deploy the cover over said second side of the bed, whereby with said cover deployed in said fully extended orientation over the second side of the bed, the continued rotation of said second spindle moves said second spindle beneath said second side of the bed.

BRIEF DESCRIPTION OF THE DRAWINGS

Reference may now be had to the following detailed description taken together with the accompanying drawings in which.

DETAILED DESCRIPTION OF THE PREFERRED EMBODIMENTS

Figure 1:
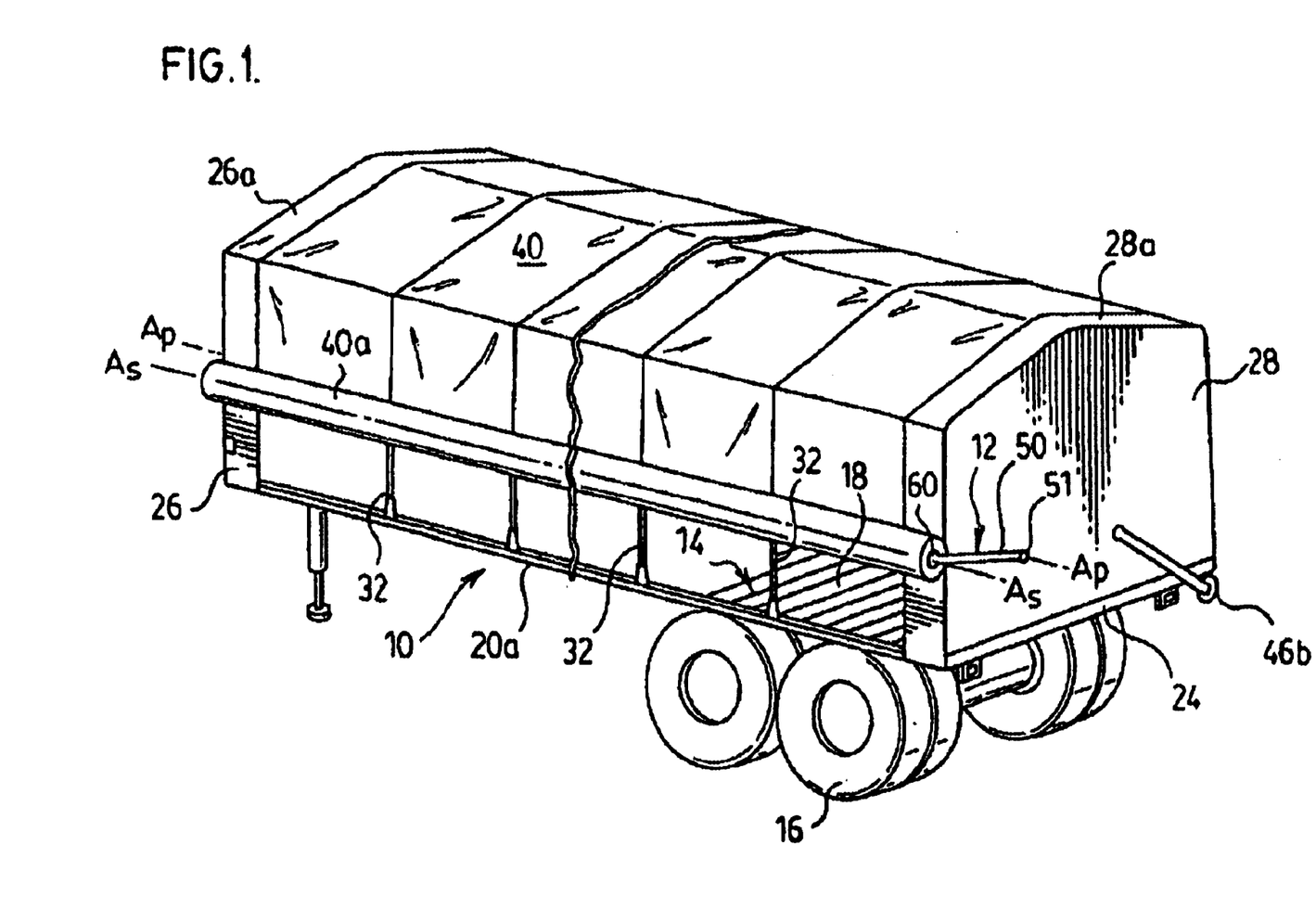
FIG. 1 illustrates a perspective view of a truck trailer having a retractable trailer enclosure system in accordance with a first embodiment of the invention, with the covering tarp in a partially retracted position.
Figure 2:
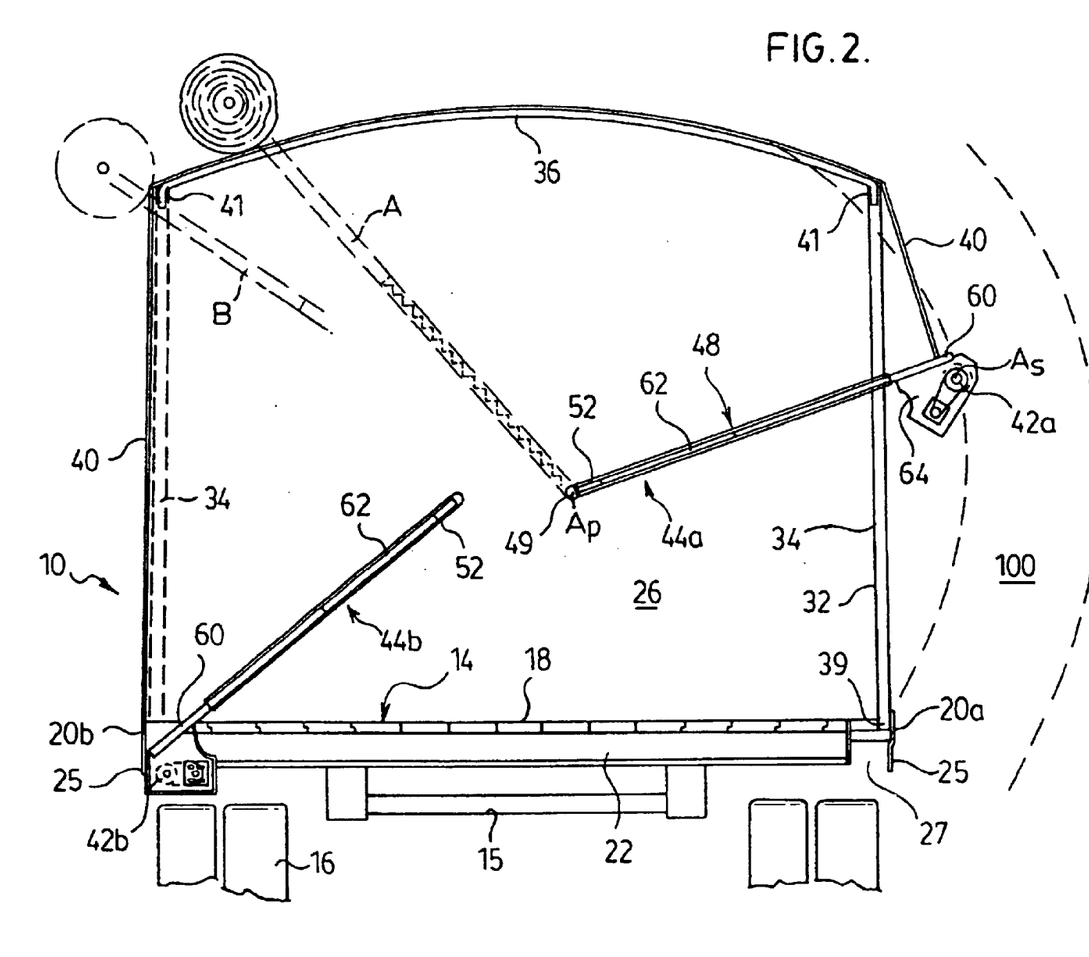
FIG. 2 shows a schematic end view of the front bulkhead of the trailer shown in FIG. 1 illustrating the manner in which the tarp is rolled and unrolled in the deployment and retraction of the tarp used in the trailer enclosure system.

Reference may now be had to FIG. 1 which illustrates a flat bed truck trailer 10 which incorporates a retractable trailer enclosure system 12 in accordance with a preferred embodiment of the invention. The trailer 10 includes a conventional flat rectangular trailer bed 14 which is mounted to a sub-frame 15 (FIG. 2) to which is secured to the trailer wheel assembly 16. The trailer bed is characterized by a planar horizontal upper bed surface 18 which includes parallel longitudinal sides 20a,20b and parallel forward and rearward lateral ends 22,24. FIG. 2 shows best the trailer bed 14 as further including along each longitudinal side 20a,20b a vertically extending flange 25 which extends downwardly from the sides of the trailer bed 14. The flanges 25 form an outer edge of a pocket 27 along each longitudinal side 20a,20b of the trailer 10. As will be described, each flange 25 acts in conjunction with the trailer enclosure system 12 to assist in providing a labyrinth-type seal, which prevents water or road debris from passing between a tarpaulin or tarp 40 used in the enclosure system 12 and sides 20a,20b of the trailer 10.

Front and rear bulkheads 26,28 are provided at each of the respective forward end 22 and rearward end 24. Each of the bulkheads 26,28 consist of a sheet metal panel secured to a 2" by 2" steel frame and extend vertically the lateral width of the trailer bed 14 to a respective uppermost curved edge 26a,28a which is formed with a central peak. The bulkheads 26,28 are formed with a height selected according to the intended types of goods 30 (FIG. 6) to be transported via the trailer 10 and most typically have a vertical height between about 6 and 8 feet.

Figure 6:
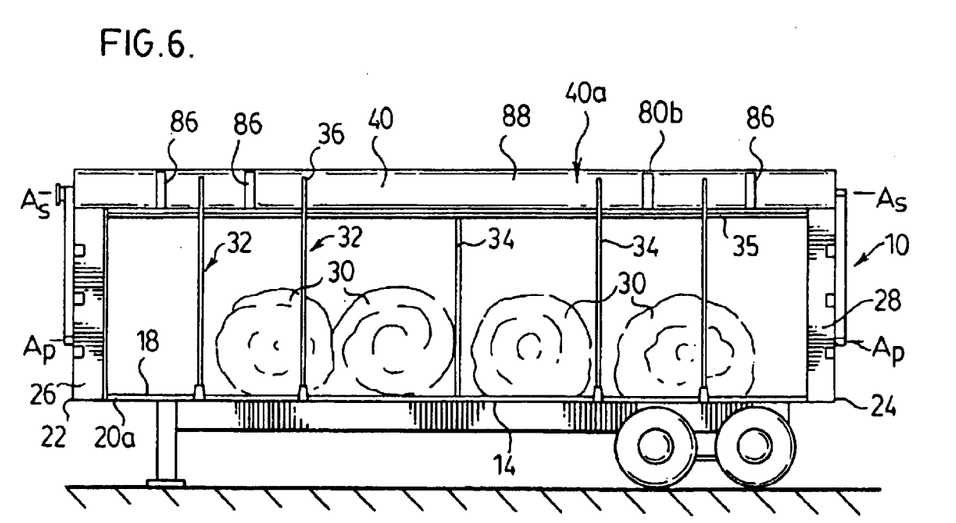
FIG. 6 illustrates a side view of the truck trailer shown in FIG. 1 with the tarp of the trailer enclosure system moved to a fully retracted position and a trailer bow partially removed to permit the loading or unloading of goods onto the trailer bed.

FIGS. 1 and 6 show best the trailer 10 as further including a series of tubular steel bows 32 which, as will be described, are used to support the flexible tarp 40 provided as part of the enclosure system 12 over the bed surface 18. The bows 32 are generally U-shaped and have a height and profile generally corresponding to that of the bulkheads 26,28. As shown in FIG. 2, each bow 32 consists of a pair of vertical supports 34 which, in assembly, are joined at their uppermost ends by a curved horizontal member 36. The lower end of each of the vertical supports 34 is removably received in a friction fit within a complementary sized socket 39 formed along the longitudinal sides 20a,20b of the trailer bed 14. Although not essential, preferably the bows 32 are of the three piece design shown best in FIG. 2, with each of the ends of the horizontal members 36 sized for fitted insertion from within a complementary sized socket 41 formed in the upper end of each vertical support 34. The three piece construction allows the bows 32 to be optionally used with an upper top rail 35 (FIG. 6) which provides additional cross-bracing. The top rail 35 may be provided with apertures which are sized to enable the ends of the members 36 to be inserted therethrough into the sockets 41. The supports and horizontal member 34,36 have a length selected to permit the assembled U-shaped bows 32 to span laterally the width of the bed surface 18, while permitting the disassembly and removal of one or both support members 34 and/or the horizontal support member 36 to facilitate the loading or unloading of goods 30 onto the trailer bed.

FIG. 2 shows best the enclosure system 12 used to cover or uncover the trailer bed 18 in the loading, transport and unloading of goods 30 thereon. In the enclosure system 12, the flexible tarpaulin or tarp 40 has a longitudinal length and width selected to cover the trailer bed 14 when unfurled, stretched over the bows 32. More preferably, when fully unfurled over the bows 32, the tarp 40 extends vertically downwardly to lower longitudinal edge portions 46a,46b which locate vertically below the bed surface 18. In a preferred construction, the enclosure system 12 also includes a pair of cylindrical spindles 42a,42b, each elongated along a respective spindle axis $A_s$ (FIG. 1) having a length corresponding to that of the trailer 10, and mounted to a respective spindle assembly 44a,44b. As shown best in FIG. 2, each of the spindle assemblies 44a,44b are provided with the identical construction and are mounted in a mirror arrangement about the longitudinal centre of the truck trailer 10. The spindle 42a is secured to the first longitudinal edge portion 46a of the tarp 40, with spindle 42b secured to the second opposite longitudinal edge portion 46b. The longitudinal edge portion 46a of the tarp 40 may be secured to the spindle 42a in a number of possible manner. In a simplified construction, the edge portion 46a of the tarp 40 is coupled to the spindle 42a by the use of screws or other mechanical fasteners. The spindle assemblies 44a,44b and their associated spindles 42a,42b may be independently operated to selectively retract or extend either side of the tarp 40, depending upon which side of the trailer 10 is to be loaded or unloaded. For brevity, the spindle assembly 44a is described in detail with the retraction or extension of the tarp edge portion 46a. It is to be appreciated that the spindle assembly 44b operates in the identical manner in the retraction or extension of tarp edge portion 46b with like reference numerals used to identify like components.

The spindle mount assembly 44a is shown best in FIGS. 1 and 2 as including a pair of telescoping pivot rods 48,50 which, when the tarp 40 is extended so as to cover the trailer bed 14, extend in a lateral direction towards the longitudinal side 20a of the trailer 10. Each of the pivot rods 48,50 has the identical length and extends from a proximal end 52 to a distal end portion 60 remote therefrom. The proximal ends 52 of each of pivot rods 48,50 are secured to an associated pivot 49,51 respectively which are mounted to the front bulkhead 26 and rear bulkhead 28. It is to be appreciated, that the pivot rods 48,50 have a length selected to maintain the spindle 42 in a substantially parallel orientation to the horizontal surface of the bed surface 18. The distal end portion 60 is provided as a telescoping member which may be moved outwardly relative to the proximal end 52. As shown best in FIG. 2, a tensioning spring 62 is used to resiliently bias the telescoping portion 60 to a retracted position spaced towards the proximal end 52. As seen best in FIGS. 1 and 2, the pivot 49 is spaced above the bed surface 18, and is laterally offset from the longitudinal centre of the trailer bed 14 towards the trailer side 20a. Pivot 51 is provided in a corresponding position secured to the rear bulkhead 28, such that each of the pivot rods 48,50 are movable about a pivot axis $A_p$ which is parallel to both the pivot axis $A_s$ and the plane of the horizontal bed surface 18.

Figure 3:
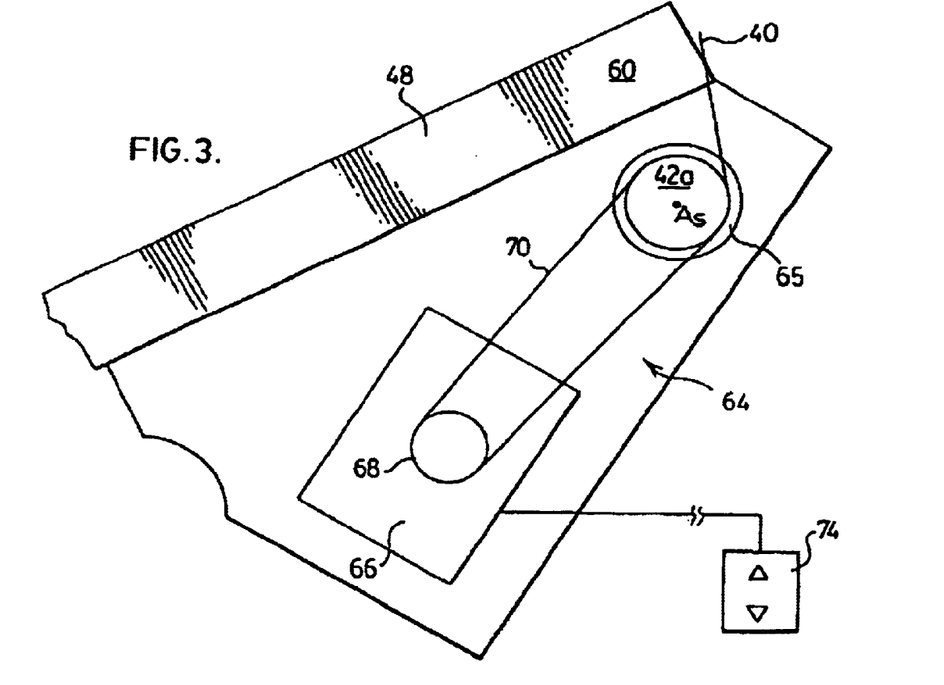
FIG. 3 shows an enlarged schematic end view of a motor and spindle mounting bracket used to roll and unroll the tarp in the retraction and deployment of the enclosure system shown in FIG. 1.

As shown best in FIGS. 2 and 3, a spindle mounting bracket 64 is secured to the distalmost end portion 60 of each of the pivot rods 48,50. The mounting bracket 64 each includes a rotary bushing 65 which rotatably engages and secures a respective end of the spindle 42a. Thus, the spindle 42a is rotatably secured to the spindle mounting bracket 64 so as to be movable together with the pivot rods 48,50 about the pivot axis $A_p$.

The spindle mounting bracket 64 which is secured to the pivot rod 48 further is shown best in FIG. 3 as including a drive which is selectively operable to engage the spindle 42a and actuate it in rotational movement about the spindle axis $A_s$. In a simplified embodiment, the drive includes an electric motor 66 secured to the spindle mounting bracket 64 of the front pivot rod 48. The motor 66 includes a drive shaft 68 and a drive belt or chain 70 which engages both the shaft 68 and end of the spindle 42a. Optionally, a remote control pad 74 may be used to selectively actuate the motor 66 in rotation in either direction, whereby the rotating drive shaft 68 and belt 70 are used to rotate the spindle 42a about its longitudinal axis $A_s$.

Each of the rods 48,50 has an overall length selected to permit the telescoping distal end portion 60 and spindle 42a carried thereby to move radially about the respective pivots 49,51 and pivot axis $A_p$ so as to travel along the bows 32. In particular, because of the telescoping movement of the distal end portions 60, the spindle mounting brackets 64 and spindle 24a carried thereby are movable along an arcuate extending path or corridor about the pivot axis $A_p$. The radial outermost extent of the arcuate corridor is defined by the path of radial movement of the spindle mounting bracket 64 when the distal end portion 60 is moved against the bias of the spring 62 to an outermost extended position. The innermost radial path of the arcuate corridor is defined as the path of radial movement of the mounting bracket 64 and spindle 42a about the pivot axis $A_p$ when the distal end portion 60 is moved fully inwardly by the bias of the tensioning spring 62. It is to be appreciated that the pivot rods 48,50 have a telescoping length selected such that the outermost radial path of movement of the spindle mounting bracket 64 is greater than or equal to the maximum radial spacing between the pivot axis $A_p$ and the bows 32 so as to permit movement of the spindle 42a thereabout.

As will be described, in the operation of the tarp enclosure system 12, the activation of the motor 66 and the rotation of the spindle 42a about the spindle axis $A_s$ in a first rotational direction results in the tarp 40 coiling about the spindle 42a. As the tarp 40 is coiled about the spindle 42a, the coiled edge 40a (FIG. 5) of the tarp 40 progressively increases in diameter. As the coiled edge 40a of the tarp 40 increases in diameter, it engages against the bows 32 and/or front and rear bulkheads 26,28. The increasing diameter of the coiled edge 40a acts to move the spindle 42a radially outwardly away from the pivot axis $A_p$ moving therewith the mounting bracket 64 and distal end portion 60 of the pivot rods 48,50 against their respective tensioning spring 62. The tensioning spring 62 assists in maintaining the tarp 40 stretched tightly over the bows 32 as the tarp 40 is coiled or uncoiled about the spindle 42a.

The tensioning spring 62 and telescoping movement of the end portion 60 advantageously allow the spindle 42a and longitudinal edge portion 46a (FIG. 4) of the tarp 40 to be moved into the pocket 27 formed along the side 20a of the trailer bed 14. It is to be appreciated that the location of the spindle 42a and tarp edge portion 46a within the pocket 27 advantageously provides a labyrinth-type seal between the tarp 40 and the side 20a of the trailer bed 14 minimizing the likelihood of water or wind passing therebetween. The pivot rods 48,50 have a length selected to permit the movement of the spindle 42a along the arcuate path shown in phantom in FIG. 2, with the telescoping end portion 60 being movable in a partially extended position against the bias of the spring 62 to enable the spindle 42a to pass below the lowermost edge of the flange 25. Upon moving past the flange 25, the resilient bias of the spring 62 thus acts to move the spindle 42a radially inwardly towards the pivot axis $A_p$ and into the pocket 27, as for example is shown by the positioning of the spindle mount assembly 44b shown in FIG. 2. When so positioned, the tarpaulin portion 46a,44b wrap downwardly and upwardly around the flanges 25.

Figure 4:
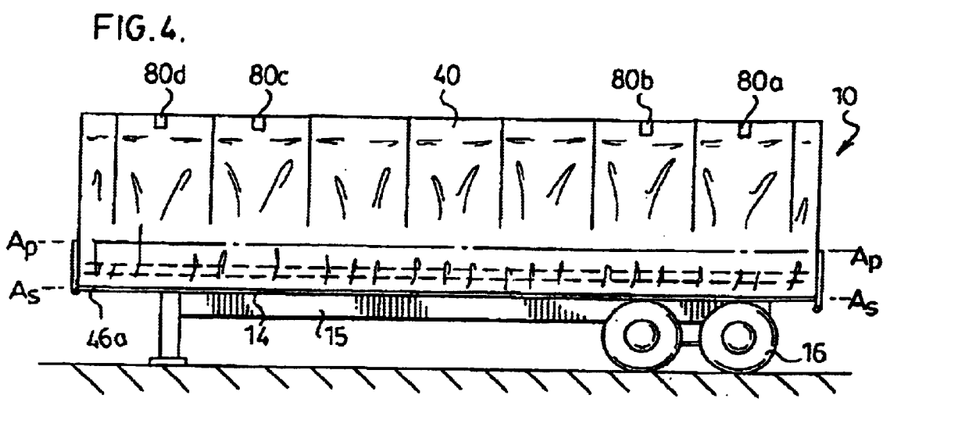
FIG. 4 illustrates a perspective side view of the truck trailer shown in FIG. 1 with the tarp moved to a fully extended or covering position.
Figure 5:
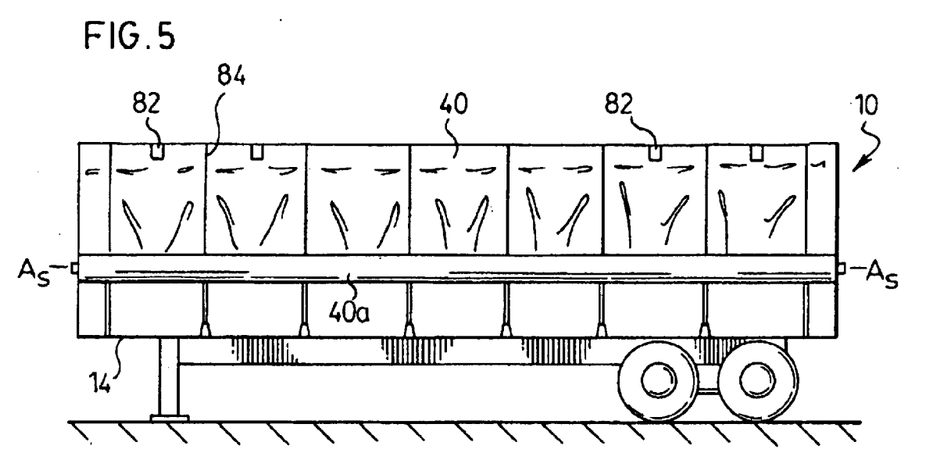
FIG. 5 illustrates a side view of the truck trailer shown in FIG. 1.

FIGS. 4 to 6 show the tarpaulin 40 as being provided optionally with a series of elongated hook and loop fastener strips 80*a*,80*b*,80*c*80*d*. The hook strip portion 82 of each fastener strip is provided on an upper outwardly facing side 84 of the tarp 40, so as to orient upwardly when the tarp 40 is fully extended over the trailer bed 14 as shown in FIG. 4. The loop strip portion 86 of each fastener strip is provided on the inwardly facing side 88 of the tarp 40 substantially aligned with the associated hook strip portion 82.

The operation of the trailer enclosure system 12 may be best described with reference to FIGS. 4 to 6. In an initial covering configuration shown in FIG. 4 where, for example, the trailer 10 is loaded and ready for transport, the spindle 42*a* is located within the pocket 27 which extends beneath the longitudinal side 20*a* of the trailer bed 14. Similarly, the spindle 42*b* is positioned within the pocket 27 extending beneath the second other longitudinal side 20*b* of the trailer bed 14. When the spindles 42*a*,42*b* are so positioned, the tarp 40 is tightly stretched across the bows 32, as well as upper edges 26*a*,28*a* of the front and rear bulkheads 26,28.

To retract the tarp 40, the motor 66 is actuated by the user depressing the appropriate button on the control pad 74 (FIG. 3). It is to be appreciated that the control pad 74 may be provided in a location remote from the trailer bed 14, thus enabling the user to activate the trailer enclosure system 12 from a position either standing on the ground beside the trailer, or even from the truck trailer cab.

Upon initial actuation of the motor 66, the rotation of the motor drive shaft 68 rotates the spindle 42*a* in the first direction to commence coiling the tarp 40 in a first winding direction thereabout. As the portion 46*a* of the tarp 40 is initially wound about the spindle 42*a*, the rolling of the tarp 40 draws the spindle 42*a* out of the pocket 27. With the drawing force on the spindle 42*a*, the telescoping end portions 60 of both of the pivot rods 48,50 are initially extended against the bias of the springs 62 associated therewith, allowing the spindle 42*a* to move past the lower edge of the side flange 25. As the tarpaulin 40 is progressively wound about the spindle 42*a*, the winding of the tarp 40 about the spindle 42*a* results in the pivot rods 48,50 being rotated upwardly about the pivot axis $A_p$, as for example initially to the positions shown as Phantom A and then B shown in FIG. 2. As the spindle 42 is moved, the springs 62 again move the telescoping end portions 60 of the pivot rods 48,50 to the retracted position while the spindle 42*a* and pivot arms 48,50 move vertically. This maintains the spindle 42*a* close to the vertical sides of the trailer 10 to assist in maintaining the tarp 40 stretched and under tension as the spindle 42*a* moves generally along the arcuate path 100 shown in FIG. 2.

It is to be appreciated that as the tarp 40 continues to be wound about the spindle 42*a*, the spindle 42*a* is rotated upwardly against the upper portions of the vertical supports of the bows 32 and front and rear bulkheads 26,28. The contact between the coiled tarp 40 and the bows 32 results in the telescoping end portions 60 of each of the pivot rods 48,50 again sliding outwardly towards an extended position away from the pivots 49,51 and against the bias of the springs 62. The tensioning of the springs 62 on the telescoping portion 60, as the spindle 42*a* is rotated, upwardly maintains the tarpaulin 40 under tension. As a result, the tarp 40 is tightly wound thereabout as the spindle 42*a* moves across the horizontal supports 36 of the bows 32.

As the coiled tarp edge 40*a* moves horizontally across supports 36, the hooked strip portion 82 of each hook and loop fastener 80 is brought into engaging contact with the associated loop strip portion 86 on the opposing side of the tarp 40. The engagement between the hook and loop strips 82,86 advantageously prevents the pivot rods 48 and 50, as well as the spindle 42*a* from moving ahead of the coiled tarp 40.

Preferably, the motor 66 is continued to be operated until the spindle 42*a* is positioned with the tarp 40 coiled thereabout to a sufficient extent to enable removal of a vertical support member (shown as 34*a* in FIG. 2) and the horizontal member 36 of one or more bows 32 along the longitudinal side 20*a* of the trailer bed 14 to be removed, as for example is shown in FIG. 6. The removal of the vertical support 34*a* and horizontal member 36 thus facilitates the loading or unloading of the goods 30 onto the trailer bed surface 18. Following the completion of unloading or loading of the goods 30, the bows 32 are reassembled by re-inserting the vertical supports 34 in the corresponding sockets 39 formed in the trailer bed 14, and repositioning the horizontal members 36 in the upper sockets 41 of the support members 34.

The motor 66 is thereafter reversed by the user selecting the appropriate button on the control pad 74 to return the tarp 40 to the deployed position, covering the trailer bed surface 18. The reversal of the motor 66 rotates the spindle 42*a* in the second opposite direction and uncoils the tarp 40 so as to move in the opposite direction. Once the tarp 40 is fully unfurled and the spindle 42*a* is moved below the bed surface 18, the continued rotation of the spindle 42*a* results in the tarp 40 coiling thereabout in the opposite winding direction. This in turn tensions the tarp 40 over the bows 32 and results in the telescoping portions 60 of the pivot rods 48,50 being retracted inwardly to return the spindle 42*a* into the pocket 27.

In reversing the motor 66 to return the coiled tarp edge 40*a* from the retracted position shown in phantom B of FIG. 2, to the fully extended position shown in FIG. 4, the unwinding of the tarp 40 again moves the spindle 42*a* in the reverse direction. If hook and loop fasteners are present, the engagement between the hook strip portion 82 and loop strip portion 86 of the hook and loop strips 80*a*,80*b*,80*c*80*d* assists in moving the spindle 42*a* and uncoiling of the tarp 40 over the curved upper surface of the horizontal members 36 of the bows 32. As the spindle 42*a* moves past the central peak of the curved edges 26*a*,28*a* of the bulkheads 26,28, gravity assists in the downward movement of the spindle 42*a*. As with the retraction of the tarp 40, in deployment, the telescoping end portions 60 of the pivot rods 48,50 are extended away from the pivot axis $A_p$ as the spindle 42*a* moves across the horizontal members 36 and upper ends of the vertical supports 34 of the bows 32. As the tarp 40 is progressively unwound and, for example, the spindle 42 reaches the position shown in solid lines in FIG. 2, the springs 62 of each pivot rod 48,50 again retract the associated telescoping end portion 60 maintaining the coiled tarp 40*a* adjacent to the vertical sides of the trailer 14.

As the spindle 42*a* moves bellow the longitudinal side 20*a* of the trailer bed 18, the rotating spindle 42*a* is moved beneath the flange 25 whereupon, the spindle rotation begins to coil the tarp 40 about the spindle 42 in the opposite direction. This tensions the tarp 40 over the bows 32 and bulkheads 26,28, and resulting in the spindle being redrawn into the pocket 27, as for example is shown with spindle 42*b* in FIG. 2.

It is to be appreciated that with the preferred embodiment, either longitudinal side of the tarp 40 may be retracted to permit unloading or loading of the trailer 10 as needed. Furthermore, the trailer enclosure system 12 may be deployed without requiring that a driver or shipping personnel manually secure the tarp 40.

Although the preferred embodiment describes the enclosure system 12 as including a spindle mount assembly 44a having a single electric motor 66 used to engage the spindle 42a, and coupled to the mounting bracket 64 of front pivot rod 48, it is to be appreciated that if more torque is needed, electric motors could be provided on both the front and rear pivot rods 48,50 adapted for either independent or concurrent operation. Alternately, in a less preferred embodiment the electric motors could be omitted in their entirety, and the tarp 40 could be extended or retracted by manually turning the spindles 42a,42b.

While FIGS. 4 to 6 illustrate the invention as including a tarpaulin provided with elongated hook and loop fasteners, such fasteners are not essential and may be omitted. In an alternate construction, the coiling and uncoiling of the tarp 40 about the spindle 42a alone may actuate its movement about the pivot axis $A_p$. Alternately, mechanical gear-type drives and/or spring biasing members may be used to facilitate the movement of the spindle 42a along its arcuate path.

Figure 7:
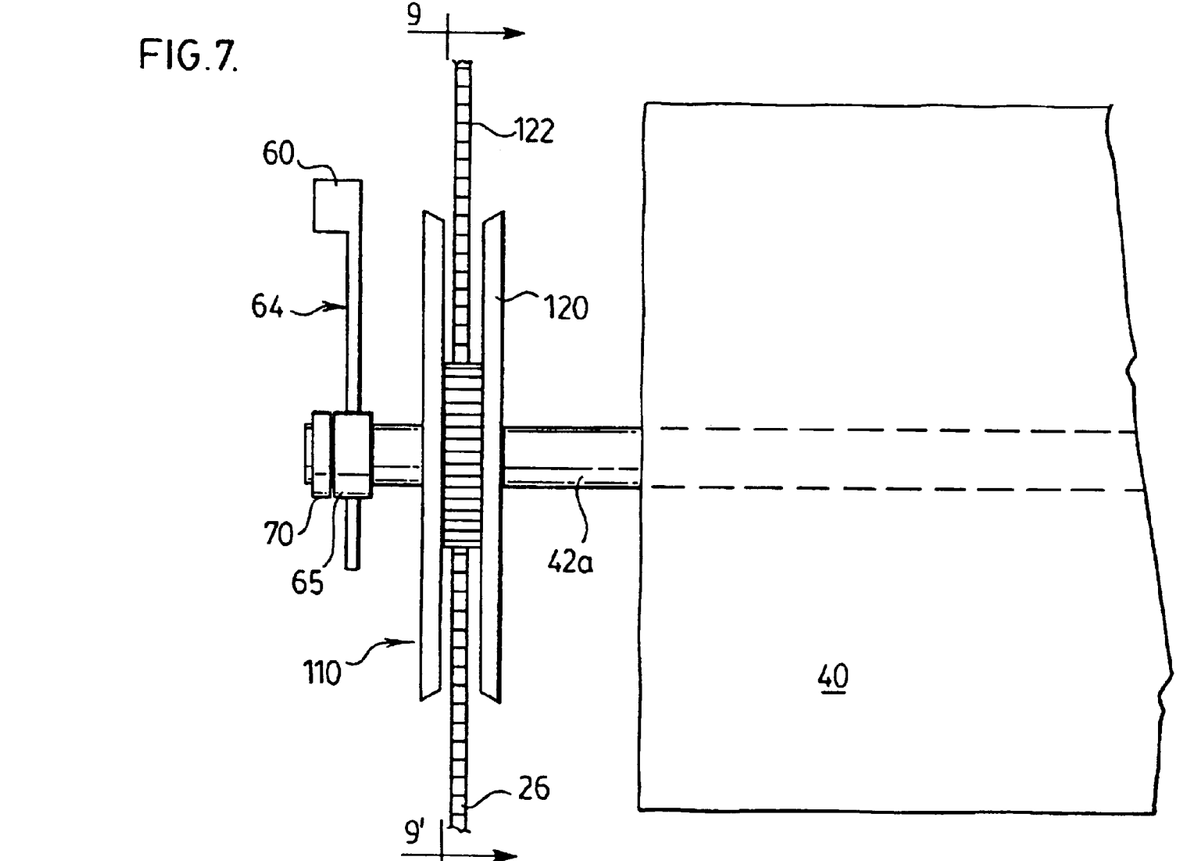
FIG. 7 illustrates a schematic top view of a spindle end, and gear drive assembly used in a tarp enclosure system in accordance with a further embodiment of the invention, with the tarp in a partially retracted position.

FIG. 7 shows an enlarged view of a gear drive assembly 110 coupled to the forwardmost end of the spindle assembly 42a, and with the tarp 40 moved to a partially retracted position mid-way across the bulkhead 26, and wherein like reference numerals are used to identify like components. The gear drive assembly 110 includes a gear 120 used to facilitate movement of a rack 122 which is formed in the bulkhead 26 as the spindle 42a rotates.

Figure 8:
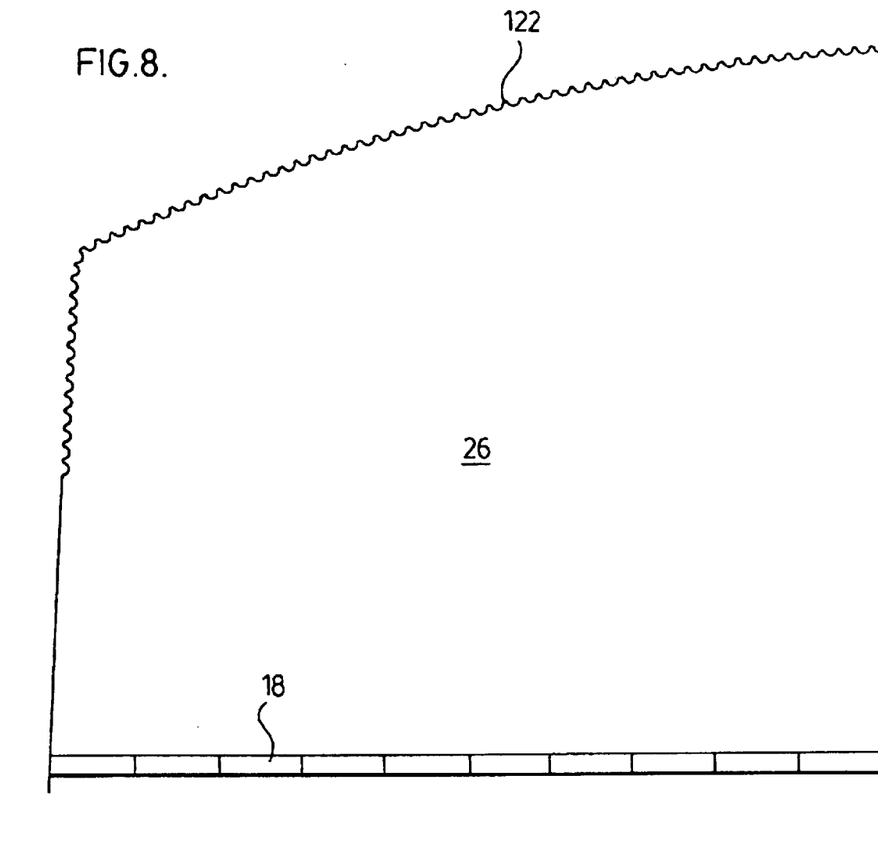
FIG. 8 shows a partial schematic view at a trailer front bulkhead used in the trailer enclosure system of FIG. 7.

As shown best in FIG. 8, the uppermost edge of the bulkhead 26 is formed so as to present the upwardly extending rack 122. Most preferably, the rack 122 is provided across the entire uppermost surface of the bulkhead 26 and extends partway down each vertical side of the bulkhead 26 symmetrically about its vertical centre. In a simplified construction, the rack 122 is formed by laser cutting the desired tooth pattern and spacing in the metal panel used in the manufacture of the bulkhead 26. As will be described, the rack 122 assists in the movement of the spindle 42a over the bows 32 as the tarp 40 is retracted and extended.

Figure 9:
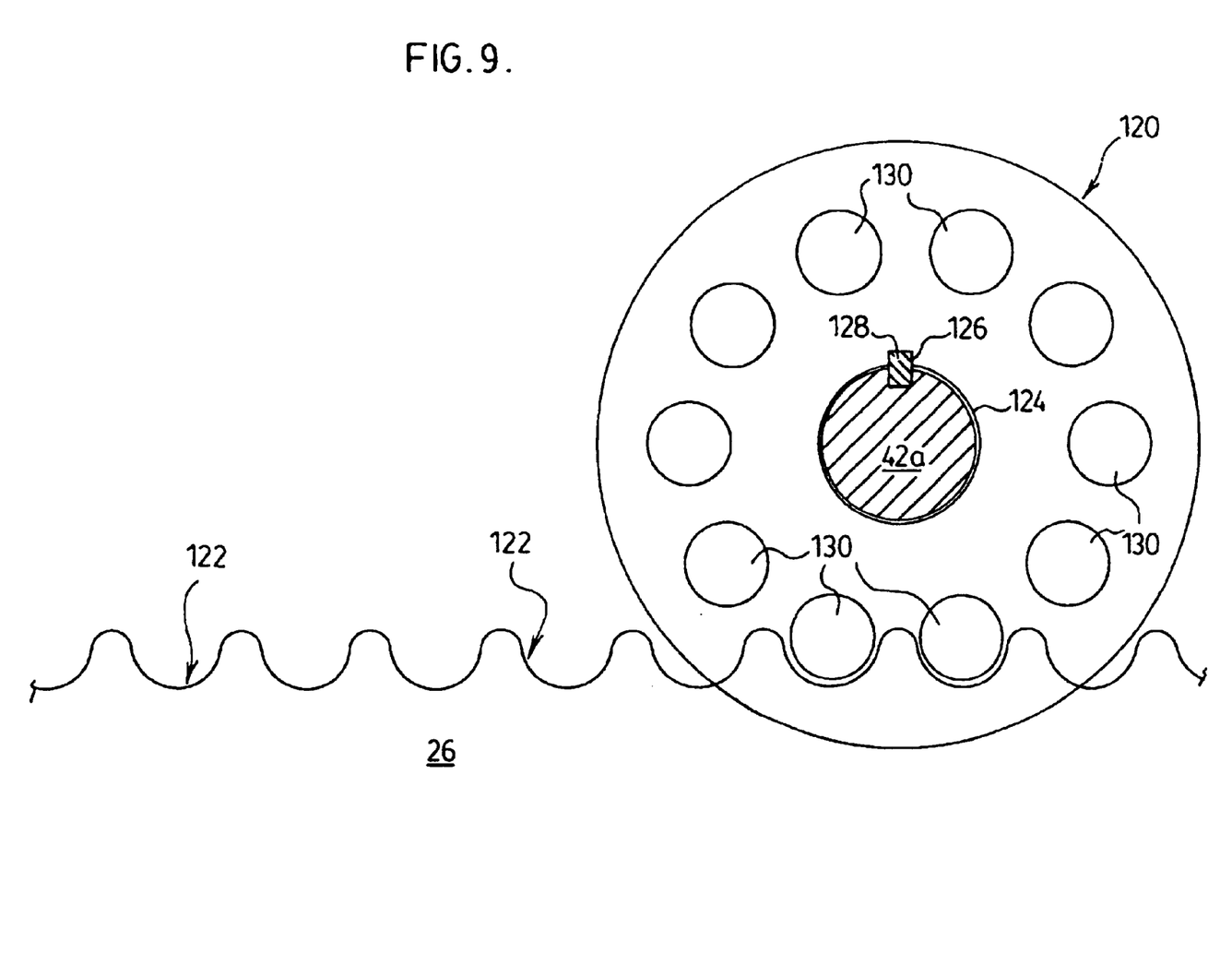
FIG. 9 shows an enlarged cross-sectional side view of the gear drive assembly and bulkhead shown in FIG. 7 taken along line 9–9'.

FIGS. 7 and 9 show best the gear 120 as being secured to the spindle 42a in a position laterally aligned with the edge of the bulkhead 26. The gear 122 is positioned between the mounting bracket 64 and tarp 40 and is coupled directly to the spindle 42a for rotation therewith. In FIG. 9, an end of the spindle 42a is inserted through a complementary sized bore 124 formed through the centre of the gear 120. A keyway 126 is formed through aligned portions of the bore 124 and spindle 42a. A key 128 positioned in the keyway 126 secures the gear 120 to the spindle 42a for rotation therewith.

As shown best in FIGS. 7 and 9, the gear 120 is provided with cylindrical sprocket teeth 130 which have a profile selected for complementary engagement with the rack 122 formed in the bulkhead 26. It is to be appreciated, however, that the gear 120 could have differing tooth profiles depending upon the rack configuration to be used.

With the gear drive assembly 110 of FIG. 7, as the coiling of the tarp 40 moves the spindle 42a along its arcuate path, the gear 120 is moved into meshing engagement with the rack 122. The engagement between the gear 120 and rack 122 thus further provides a positive drive to move the rotating spindle 42a over the horizontal extent of the bows 36.

Although FIG. 7 illustrates the front bulkhead 26 and adjacent portion of the spindle 42a, it is to be appreciated that the rear bulkhead 28 could be formed with the identical rack profile, and with a corresponding gear drive assembly secured to the portion of the spindle 42a adjacent thereto.

Although the preferred embodiment of the invention describes the enclosure system 12 as including a pair of spindle mount assemblies 44a,44b and spindles 42a,42b used to selectively raise or lower both longitudinal edge portion 46a,44b of tarp 40, the invention is not so limited. If desired, in a more economical version, a single spindle and spindle mounting assembly could be provided. In such a configuration, it would be conceivable that the front and rear pivot arms 48,50 would have a length selected to permit the substantially complete coiling of the tarp 40 about a single spindle.

Although the preferred embodiment of the invention illustrates the bows 32 as having upwardly curving horizontal support members 36, the invention is not so limited. If desired, the trailer could be provided with tarpaulin supporting bows which include peaked or flat horizontally extending support members. Optionally, if desired the bulkheads 26,28 and/or pivots 49,51 could be provided with projection or other member used to limit the pivoting movement of the rods 48,50 beyond a predetermined threshold point.

Although the preferred embodiment of the invention describes the trailer enclosure system 12 as being used with a flat bed trailer 10, the invention is not so limited. It is to be appreciated that the tarp enclosure system may be used with a number of different trailer configurations having permanent or removable bows 32, or other types of tarpaulin supports where the vertical retraction of a flexible tarp or cover along one or both sides of the trailer is desired.

Although the detailed description describes and illustrates various preferred embodiments, the invention is not so limited. Many modifications and variations will now occur to persons skilled in the art. For a definition of the invention, reference may be had to the appended claims.

I claim:

1. A retractable trailer enclosure system for covering at least part of the bed of a truck trailer having longitudinally elongated parallel sides and laterally extending ends, at least one bow member having a generally horizontal member laterally spanning said bed and supported a vertical distance thereabove, the enclosure system comprising, a flexible cover having a longitudinal length substantially corresponding to a length of said parallel sides and a lateral width selected whereby with the cover in a fully extended orientation overlying the at least one bow member, the cover extends vertically downwardly to a lower edge portion located vertically below a surface of an adjacent one of said trailer bed sides, a spindle elongated along an axis and having a length generally corresponding to the length of a first one of said trailer sides, a spindle mount for movably supporting the spindle in a substantially horizontal orientation generally parallel to the longitudinal direction of said first side, the spindle mount including a pair of pivot rods, a first one of said pivot rods being pivotally secured at an associated pivot proximate a first one of said lateral end of said bed, the second other one of said pivot rods being pivotally secured at an associated pivot proximate to the second other one of said lateral ends, each of the first and second pivot rods extending from said associated pivot laterally to a distalmost end, the distalmost end of each of said pivot rods being movable relative to said associated pivot, and further comprising a spindle coupling at said distalmost end thereof, said spindle coupling rotatably supporting said spindle between a retracted position spaced towards said associated pivot and an extended position moved outwardly therefrom, a drive for selectively journaling the spindle in rotational movement about its axis, the cover being secured along said lower edge portion to the spindle whereby the rotation of the spindle by said drive winds or unwinds the cover about the spindle to retract or deploy the cover over said part of the bed, whereby with said cover unwound in said fully extended orientation, the continued rotation of said spindle moves said spindle beneath said surface of said adjacent trailer bed side to assist in tightening the cover against the at least one bow member.

2. The retractable enclosure system as claimed in claim 1 wherein said cover is retracted by actuating said drive to rotate said spindle in a first direction to wind said cover thereabout in a first winding direction, said drive is operable to rotate said cover in a second opposite direction to deploy said cover, whereby with said cover unwound in said fully extended orientation, the continued rotation of the spindle in the second direction winds the cover about the spindle in a second winding direction opposite to said first winding direction to assist in tensioning said cover against said at least one bow member.

3. The retractable enclosure system as claimed in claim 1 wherein said trailer includes a front end bulkhead adjacent said first lateral end and a rear end bulk head adjacent said second lateral end, the pivot associated with the first pivot rod being mounted to the front end bulkhead, and the pivot associated with the second pivot rod being mounted to the second bulkhead, each of the first and second pivot rods being rotatable about their respective pivots between a cover deploying position where said distalmost end is moved adjacent one of said trailer bed sides and a cover retracting position wherein said distalmost end is moved generally towards said horizontal member.

4. The retractable enclosure system as claimed in claim 2 wherein each said rod includes a tensioning member for resiliently biasing the distalmost end towards the retracted position.

5. The retractable enclosure system as claimed in claim 4 wherein said at least one bow member comprises one of a number of removable bow members, each removable bow member further comprising a pair of generally vertical supports extending from a respective opposing side of said bed to an upper end, each pair of vertical supports supportingly engaging a respective horizontal member.

6. The retractable enclosure system as claimed in claim 1 wherein the drive comprises a reversible electric motor having a rotatable motor shaft and a linkage connecting the motor shaft and the spindle for rotation therewith.

7. The retractable enclosure system of claim 1 wherein the flexible cover further includes a hook strip of a hook and loop-type fastener on a first planar side thereof, and a loop strip of the hook and loop-type fastener on a second planar side thereof, the loop strip being secured to the second planar side so as to be engageable by at least part of the hook strip as the cover is wound about the spindle.

8. The retractable enclosure system as claimed in claim 1 wherein the truck trailer further includes, a bulkhead spanning said bed and further comprising a laterally extending rack, a gear coupled to said spindle and being positioned for engaging at least a portion of the rack when said cover is retracted or extended whereby the engagement of the gear with the rack assists in movement of the spindle relative to the bulkhead, the at least one bow member further including a pair of generally vertical supports for supporting the horizontal member above said trailer bed.

9. The retractable enclosure system as claimed in claim 8 wherein each of said pivot rods have a length selected to permit movement of said distalmost end along a radial path, wherein when the distalmost end of each rod is in said retracted position, the distalmost end is spaced from said associated pivot by a distance selected less than the distance between the associated pivot and an upper end of the vertical supports, and wherein when the distalmost end of each rod is in said extended position, the distalmost end is spaced from said associated pivot by a distance selected greater than the distance between the associated pivots and the upper end of the vertical supports.

10. The retractable enclosure system as claimed in claim 2 wherein said trailer further including a longitudinally extending flange member extending downwardly along the first one of said sides and defining a longitudinally elongated pocket for receiving said spindle when said cover is wound in said second winding direction in deployment over said part of the bed.

11. A retractable enclosure system for covering the upper surface of a longitudinally elongated bed of a truck trailer comprising, a plurality of bow members laterally spanning said trailer bed, a flexible cover having a longitudinal length substantially corresponding to the length of said bed and a lateral width selected whereby with the cover in a fully extended orientation overlying the bow members, the cover extends vertically downwardly to a lower edge portion located vertically below a surface of an adjacent trailer bed side, a spindle elongated along an axis and having a length substantially corresponding to the longitudinal length of the bed, a spindle mount for movably supporting the spindle in an orientation substantially parallel to the upper surface of the bed, the spindle mount comprising a pair of pivot rods each being elongated from a first end portion to a second end portion, the second end portion of each of said pivot rods being movable relative to said first end portion between a retracted position spaced towards said first end portion and an extended position moved distally therefrom, a front end bulkhead adjacent to of said bed and a rear end bulkhead adjacent to of the bed, the first end portion of a first one of said pivot rods being mounted at an associated first pivot secured to said first bulkhead, the first end portion of the second other one of said pivot rods being mounted at an associated second pivot secured to said second bulkhead, the spindle being rotatably supported by the second end portions of each of the pivot rods, a drive operable to selectively journal the spindle in rotational movement about its axis, and wherein the cover is secured along the lower edge portion to the spindle whereby the rotation of the spindle by the drive winds or unwinds the cover about the spindle to retract or deploy the cover over the bed, and whereby with said cover unwound in said fully extended orientation, the continued rotation of said spindle moves said spindle to a position substantially beneath said surface of the adjacent bed side.

12. The retractable enclosure system as claimed in claim 11 wherein said cover is retracted by actuating said drive to rotate said spindle in a first direction to wind said cover thereabout in a first winding direction, and said drive is operable to rotate said cover in a second opposite direction to deploy said cover, whereby with said cover unwound in said fully extended orientation, the continued rotation of the spindle in the second direction winds the cover about the spindle in a second winding direction to assist in tensioning said cover against said bow members.

13. The retractable enclosure system as claimed in claim 10 wherein each of the first and second pivots are spaced above and proximate to a medial portion of the trailer bed, each of said bow members laterally spanning said bed, and further comprising a pair of generally vertical supports, the vertical supports of each bow member extending from opposing sides of said bed to an upper end, and further including a generally horizontal bracing member engaging each of said upper ends for supporting said cover spaced above the surface of said bed.

14. The retractable enclosure system as claimed in claim 13 wherein each of said pivot rods comprise a telescoping second end portion and have a length selected to permit movement of said second end portion, in said fully retracted position along a radial path spaced from said associated pivot by a distance selected less than the distance between the associated pivot and the upper ends of the vertical supports, and in said extended position along a radial path spaced from said associated pivot by a distance selected greater than the distance between the associate pivot and the upper ends of the vertical supports.

15. The retractable enclosure system as claimed in claim 11 wherein each of said pivot rods further includes a tensioner for resiliently biasing the second end portion towards the retracted position.

16. The retractable enclosure system as claimed in claim 15 wherein the drive comprises a reversible electric motor having a rotatable motor shaft and a linkage rotatably connecting the motor shaft and the spindle.

17. The retractable enclosure system as claimed in claim 12 wherein said bed is a rectangular bed having parallel longitudinally extending sides, said trailer further including a longitudinally extending flange member extending downwardly along a first one of said sides and defining a longitudinally elongated pocket for receiving said spindle when said cover is rotated in said second winding direction.

18. The retractable enclosure system of claim 12 wherein the flexible cover further includes a hook strip of a hook and loop-type fastener on a first planar side thereof, and a loop strip of the hook and loop type fastener on a second planar side thereof, the loop strip being secured to the second planar side so as to be engageable by at least part of the hook strip as the cover is wound about the spindle.

19. A retractable trailer enclosure system for covering a trailer bed characterized by longitudinally elongated first and second parallel sides and laterally extending ends, the enclosure system comprising, a flexible cover having a lateral width selected whereby with the cover in a fully extended orientation overlying the trailer bed, the cover extends vertically downwardly to first and second lower side edges with said first side edge located below a surface of said first trailer bed side, and said second side edge located below a surface of said second trailer bed side, a first spindle elongated along a first spindle axis and having a length generally corresponding to the length of said first side, a first spindle mount for movably supporting the first spindle in an orientation generally parallel to the longitudinal direction of said first side, the first spindle mount including a second pair of pivot rods each secured at an associated pivot and rotatable about a first pivot axis extending generally parallel to said first spindle axis, each pivot rod extending from said associated pivot to a distalmost end and further comprising a first spindle coupling at said distalmost end thereof, said first spindle coupling rotatably supporting said first spindle, a first drive for selectively journaling the first spindle in rotational movement about said first spindle axis, a second spindle elongated along a second spindle axis and having a length generally corresponding to the length of said second trailer side, a second spindle mount for movably supporting the second spindle in an orientation generally parallel to the longitudinal direction of said second side, the second spindle mount including a pair of pivot rods each secured at an associated pivot and rotatable about a second pivot axis extending generally parallel to said second spindle axis, each pivot rod extending from said associated pivot to a distalmost end and further comprising a second spindle coupling at said distalmost end thereof, said second spindle coupling rotatably supporting said second spindle, a second drive for selectively journaling the second spindle in rotational movement about said second spindle axis, the first lower side edge of the cover being secured to the first spindle, whereby the rotation of the first spindle by said first drive winds or unwinds the cover about the first spindle to retract or deploy the cover over said first side of the bed, whereby with said cover deployed in said fully extended orientation over the first side of the bed, the continued rotation of said first spindle moves said first spindle beneath said first side of the bed, the second lower side edge of the cover being secured to the second spindle whereby the rotation of the second spindle by said second drive winds or unwinds the cover about the second spindle to retract or deploy the cover over said second side of the bed, whereby with said cover deployed in said fully extended orientation over the second side of the bed, the continued rotation of said second spindle moves said second spindle beneath said second side of the bed.

20. The retractable enclosure system as claimed in claim 19 whereby said cover is retracted along the first side of the bed by actuating said first drive to rotate said first spindle in a first direction to wind said cover thereabout in a first winding direction, said first drive is operable to rotate said cover in a second opposite direction to deploy said cover over the first side of the bed, whereby with said cover unwound in said fully extended orientation, the continued rotation of the first spindle in the second direction winds the cover about the first spindle in a second winding direction to assist in tensioning said cover against said first side.

21. The retractable enclosure system as claimed in claim 19 wherein the system further includes, a bulkhead spanning said bed and further comprising a rack provided on an upper surface thereof, a gear coupled to each of said first and second spindles and being positioned for engaging at least a portion of the rack when said cover is retracted or extended, whereby the engagement of the gears with the rack assists in movement of the spindles relative to the bulkhead, and a plurality of bow members, each of said bow members laterally spanning said bed and further comprising a pair of generally vertical supports extending from a respective opposing side of said bed to an upper end, and a generally horizontal bracing member joined to said upper ends of each pair of supports for supporting said cover spaced above the surface of said bed.

22. The retractable enclosure system as claimed in claim 21 wherein each of said first and second pivot axes are spaced above said trailer bed with said first pivot axis spaced proximate to said first side of said trailer bed relative to said second pivot axis, each of said pivot rods comprising a telescoping rod having an extendible member which is movable between a retracted position spaced towards said associated pivot and an extended position moved outwardly therefrom, and further including a tensioning member for resiliently biasing the extendible member towards the retracted position.

* * * * *